2,848,322

SEPARATION OF COBALT FROM NICKEL

John B. Conn and William K. Humphrey, Westfield, N. J., assignors to Merck & Co., Inc., Rahway, N. J., a corporation of New Jersey No Drawing. Application July 13, 1955
Serial No. 521,888

12 Claims. (Cl. 75—119)

This invention relates to the hydrometallurgy of nickel and cobalt and particularly to an improved method of producing nickel and cobalt in a high degree of purity.

Nickel and cobalt metals are very similar in many physical and chemical characteristics. The same is true of their salts and naturally-occurring mineral forms. Moreover, minerals containing both generally occur together in natural deposits and usually cannot be separated by ordinary dressing practices. For these reasons, both metals are generally present in varying amounts, in any solution resulting from any type of leaching of materials containing cobalt and nickel.

These characteristics result in many technical and economic problems. For example, in most ordinary practices, small amounts of cobalt present in nickel ore concentrates represent little of benefit to the nickel producer. Very little of the cobalt available in such materials is recovered and sold as such, primarily because by current methods the cost of separation equals or exceeds the value of the cobalt. Much, if not most, of the cobalt is lost in the slag from nickel smelting. The remainder is sold as "nickel" in nickel metal bullion or cathodes.

Similarly, small amounts of nickel present in cobalt concentrates, and therefore in the "cobalt" solutions after leaching, are of small value. It is generally either discarded, a considerable loss, or is recovered with the "cobalt." In the latter case, the nickel becomes an impurity in the cobalt metal resulting in a lower grade of metal. The producer therefore has a two-fold loss in that the market price of the nickel itself is lower and the nickel and cobalt mixed metals have a lower total market price.

In conventional metallurgy of nickel and cobalt, then, the presence of smaller but appreciable quantities of either in sources of the other, i. e., in ores, ore concentrates, scrap metals, plant by-products and the like, presents a difficult problem. This problem has heretofore been variously attacked. A generally practicable treatment, however, whereby the bulk of each can be recovered as a separate, relatively pure metal product, has not been offered.

Many processes have been proposed for separation and recovery of cobalt and nickel from mixed electrolytes. Several have been used quite extensively. Most involve the same two facts, that cobalt is more readily oxidized to the trivalent state than is nickel and that cobaltic hydroxide is relatively more insoluble at lower pH values than is nickelous hydroxide. Unfortunately, the necessary steps in such processes are complicated and repetitive, the hydroxides are difficult to filter efficiently and the resultant separations are far from perfect. Moreover, most of them also require large quantities of chemical reagents many of which may not be recovered. In addition to the effect on costs, this creates a disposal problem.

Several methods of separating nickel and cobalt from ammonium carbonate leach liquors also have been proposed. Most of these involve fractional distillation of the ammonium carbonate whereby liquor, at different stages in the process, becomes concentrated with either nickel or cobalt. This liquor may then be removed and treated separately. However, as processing methods, or as to produced metals, these are economically and practically little better than the electrolytic treatments.

Such conventional processes for the production of nickel or cobalt, are therefore commercially unsatisfactory as too complicated, wasteful, or uneconomical, or as resulting in products containing undesirably large amounts of the other metal. They also do not produce saleable metals. The resultant oxide or hydroxides must be processed further to obtain this result.

These methods are also ineffective in obtaining nickel and cobalt in high degree of purity without extensive additional and costly procedures. The requirement for these metals in ever increasing degree of purity is due to their application in ferromagnetic spinels, catalysis and as emission coatings.

An object of the invention is to produce both nickel and cobalt in a high degree of purity. Another object is to provide a simplefied process for accomplishing such a result. Other objects and the advantages of the invention will appear hereinafter.

In accordance with the invention, it has been found that nickel and cobalt can be readily separated from one another by passing a solution of a divalent ammonia nickel complex and a higher valent ammonia cobalt complex over a cation exchange resin and selectively eluting the nickel complex from the more strongly adsorbed cobalt complex.

The ammonia complexes are conveniently prepared by oxidizing a solution of the mixed metal ions of cobalt and nickel in a strongly ammoniacal aqueous medium by means of hydrogen peroxide, aeration, or other oxidizing agents, thereby converting the cobalt to a higher valence state, while leaving the valence state of the nickel complex unaffected. This phenomenon can be chemically represented as follows:

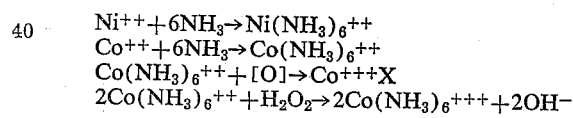

wherein X is the bonded part of the cobalt complex. The last equation represents one of the several possible cobalt complexes which could be present in the solution. By careful aeration or oxidation of the ammoniacal solution of the metals it is possible to obtain a polynuclear cobalt complex. The solution containing the divalent $Ni(NH_3)_6^{++}$ and tervalent $Co^{+++}X$ or polynuclear cobalt complex is then passed through a column containing a cation exchange resin. The cobalt is strongly adsorbed and remains on the resin under selective elution conditions which remove the nickel. The nickel, which contains only 0.01% or less cobalt, can be recovered from the eluate as a carbonate or other salt by precipitation or as a metal by conventional electrolytic means. By using the polynuclear cobalt complex it is possible to have even greater separation.

The divalent nickel and cobalt can be obtained from any ionizable source such as in carbonates, chlorides, nitrates, acetates, bromides, perchlorates, hydroxides, iodides, phosphates, sulfates, bromates and the like. The ammonia nickel and cobalt complexes are prepared by dissolving the cobalt and nickel salt in a strongly ammoniacal aqueous medium containing free ammonium ions. The ammonium ions can be from any source as ammonia gas, ammonium hydroxide or from any ammonium compound which will combine with the metals to form the metal-ammonia complexes.

The solution containing the metal-ammonia complexes is oxidized to convert the cobalt complex from the divalent state to the higher valent state. This is conveniently accomplished by adding hydrogen peroxide to the solution. The oxidation can also be carried out by other simple methods such as merely aerating the solution, or by using any of the conventional oxidizing agents such as persulfates, lead dioxide, silver salts, chlorine, bromine, iodine, bromates, iodates and the like.

The oxidized solution of ammonia complexes is then brought into contact with a cation exchange resin. This can be accomplished in several ways. Thus, the adsorption can be carried out by merely stirring the resin with the solution of the metals. It is preferred, however, to accomplish this by passing the solution of oxidized ammonia complexes through one or more columns of the resin. The adsorption can be effected from solutions of various concentrations, but it is preferred to use solutions of the oxidized ammonia complexes as concentrated as possible. Colored bands, indicating the location on the column of the different metal complexes are ordinarily visible.

Any cation exchange resin can be used in its salt form such as its ammonium, or the calcium, or sodium salt. The best separation is obtained, however, by using the ammonium form. Examples of suitable resins are those sold under the trade names Amberlite IRC-50, which is a carboxylic acid resin having some phenolic groups, Amberlite XE-93, Amberlite IR-105, Amberlite IR-120 and Amberlite IR-100, which are phenol formaldehyde resins having sulfonic groups, all of which are manufactured by Rohm & Haas Co., Philadelphia, Pa.; Dowex 30, which is a phenol formaldehyde resin obtainable from the Dow Chemical Company, Midland, Mich.; Catex, manufactured by Infilco Company, Chicago, Ill., which is a sulfonated polymer containing polyfunctional sulfonic acid groups; sodium aluminum silicate; Duolite CS-101 and Duolite C-120, obtainable from the Chemical Process Company, Redwood City, Calif., which are polystyrene resins having sulfonic acid groups; Ionac C-200, manufactured by American Cyanamid, New York, N. Y., which is a phenol formaldehyde having sulfonic acid fractional groups; and Permutit H, a resin having carboxylic acid groups, and Permutit Q, a sulfonated styrene resin having sulfonic groups, manufactured by the Permutit Co., New York, N. Y.

The nickel and cobalt salts are preferably dissolved in dilute acid solutions prior to addition to the ammoniacal solution. Suitable acids are nitric acid, hydrochloric acid, sulfuric acid and the like.

The nickel is removed from the resin by selective elution. The preferred eluting agent is a solution containing about 10 to 20% ammonium hydroxide and about 2 to 8% of ammonium salt. The ammonium salt can be a chloride, sulfate, carbonate or similar salt. The nickel removed can be recovered from the eluate as a carbonate or similar salt, or by conventional electrolytic means. As an example of a recovery procedure, nickel carbonate is obtained by the addition of sodium carbonate to the eluate which is precipitated as nickel carbonate.

The cobalt is eluted from the resin with dilute acids such as the mineral acids as for example, hydrochloric or sulfuric acid. The eluate containing the cobalt is neutralized and the cobalt can be recovered as the hydrous oxide by adding sodium carbonate and sodium salts, and boiling to precipitate the product.

In a modification of the separation procedure of the invention, the solution containing the divalent and tervalent or polynuclear complexes is passed through the column of cation exchange resin until the column becomes "flooded" or completely saturated with the complexes. At this point, the addition of the solution is continued and the eluate collected. The cobalt is more strongly adsorbed and replaces the nickel on the resin, whereby substantially pure nickel is obtained in the eluate. The eluate can be recycled to obtain even greater separation. When all the nickel on the resin has been replaced with cobalt, i. e., the cobalt "breaks through," the resin can then be eluted with acid to yield an eluate containing substantially pure cobalt. Using this procedure, however, the separation obtained is less than that obtainable by eluting with a mixture of ammonia and an ammonium salt.

The following examples are given for the purposes of illustration:

*Example 1*

A solution of nickel and cobalt is prepared by dissolving 44 g. nickel nitrate and 5 g. cobalt carbonate in dilute nitric acid (200 ml.). The solution is made strongly ammoniacal, and hydrogen peroxide (30%) is added with stirring until in excess, the excess being subsequently destroyed catalytically by addition of manganese dioxide. The solution is filtered from insolubles and passed through a column containing Duolite CS-101, which is a polystyrene resin containing sulfonic acid groups, in the ammonium form and having an in-place volume of 120 ml. The cobalt complexes form red bands (cobalt) and brown bands (the polynuclear form) at the top of the column, whereas the bulk of the column is colored blue (nickel); elution with 14% ammonium hydroxide containing 5% ammonium carbonate removes substantially all of the nickel, but does not affect the cobalt band.

*Example 2*

The procedure of Example 1 is repeated, but using Amberlite IRC-50 which is a resin containing carboxylic acid groups and some phenolic groups having an in-place volume of 120 ml., and radioactive cobalt 60 as tracer. Radioactivity measurements on the eluate indicates a 90-93% segregation of cobalt.

*Example 3*

To a mixture of 81 ml. concentrated hydrochloric acid and 20 ml. concentrated nitric acid is added gradually 17.3 g. commercial nickel flake, containing one percent cobalt, with continuous stirring. When the vigorous reaction is complete, the solution is filtered, spiked with 100 microcuries of cobalt 60, and made ammoniacal with 157 ml. 28% ammonia water. The mixture is next treated with 5 ml. 30% hydrogen peroxide, allowed to stand for thirty minutes, and excess hydrogen peroxide decomposed by stirring for thirty minutes with one gram manganese dioxide. Addition of sufficient water to dissolve all hexamine nickel chloride brings the final volume to 450 ml. Fifty ml. of this solution is preserved as standard, and the remainder is divided into 200 ml. portions which are passed through 120 ml. columns of Dowex 30 and Amberlite XE-93 which are phenol-formaldehyde resins having sulfonic acid groups in ammonium form; radioactivity measurements of the eluates shows a retention of 88% of the cobalt on Dowex 30 and 90% on Amberlite XE-93.

*Example 4*

To a mixture of 810 ml. concentrated hydrochloric acid and 200 ml. concentrated nitric acid is added gradually with stirring 173 g. (3 gram atoms) of commercial nickel flake containing one percent cobalt. When dissolution of nickel is complete, the mixture is filtered through a Celite pad, and the filter washed free of nickel; the filtrate volume is 1500 ml. To the filtrate is added under stirring 1500 ml. 28% ammonia water and 10 ml. 30% hydrogen peroxide, followed thirty minutes later by 2 g. manganese dioxide. Stirring is continued for thirty minutes longer, during which time some hexamine nickel chloride crystallizes out. Sufficient water is added to dissolve the complex salt, and the blue solution is filtered to remove the manganese dioxide: final volume 400 ml.

An Amberlite IRC-50 column, volume approximately 1200 ml., in the ammonium form, is set up and the above solution is passed through it at a rate of 70 ml./min. When all of the ammoniacal nickel is processed, washing is done, first with 9% ammonia water, and finally with a mixture of 350 ml. 28% ammonia water, 50 ml. concentrated hydrochloric acid, and water to 1000 ml. Elution is continued with this solution until all of the nickel is removed from the column (100 minutes operation): the final volume is 10 liters. The red band of adsorbed cobalt complex is high on the column and sharply defined.

To the cobalt-free nickel solution is added 350 g. sodium carbonate, and the mixture is boiled under constant and efficient stirring (to prevent bumping) until all of the nickel has been precipitated as nickel carbonate. The product is filtered, washed free from chloride, and dried at 85° C. Yield, 243 g.

The cobalt is eluated from the column with 1 N hydrochloric acid, of which 5300 ml. is required, the cobalt-containing fraction being 2700 ml. The eluate is neutralized with sodium hydroxide, 5 g. sodium carbonate and 2 g. sodium sulfite is added, and the solution is boiled until all of the cobalt is precipitated as hydrous oxide. Yield, 0.74 g. It is found that some of the cobalt is tenaciously retained on the resin, and can be removed only by soaking the resin for several hours in 6 N hydrochloric acid.

The nickel carbonate obtained gives the following spectrographic assay:

| Element: | Percent |
|---|---|
| Silver | 0.0001 |
| Cobalt | <0.01 |
| Copper | 0.01 |
| Iron | <0.001 |
| Lead | <0.001 |
| Zinc | 0.01 |

*Example 5*

To a solution of 100 g. ammonium carbonate in two liters of 14% ammonia water is added 150 g. nickel carbonate recovered in Example 4, and the mixture stirred. The nickel carbonate dissolves slowly: after about 18 hours most of it is in solution, and Raney nickel suspension prepared from 1 g. alloy is added, with stirring continued for 35 minutes. At the end of this time the Raney nickel is removed by filtration through Celite and the filtrate is boiled under stirring until all of the nickel carbonate is precipitated. The recovery amounts to 133 g., with the following spectrographic analysis:

| Element: | Percent |
|---|---|
| Silver | 0.0002 |
| Cobalt | <0.01 |
| Copper | 0.0018 |
| Iron | <0.001 |
| Lead | <0.001 |
| Zinc | 0.006 |

*Example 6*

A solution of 346 g. commercial nickel flake in 1600 ml. concentrated hydrochloric acid and 400 ml. concentrated nitric acid is prepared as in Example 4. This solution is heated to boiling under stirring, and sodium carbonate is added until all nickel is precipitated. The solid is filtered with suction, washed and dried at 85° C. Yield, 666 g.

To a solution of 100 g. ammonium carbonate in 4 liters of 14% ammonia water, there is added under stirring 326 g. of the above nickel carbonate. Dissolution is complete in thirty minutes. Ten ml. of 30% hydrogen peroxide is added, and after thirty minutes the solution is treated with manganese dioxide and filtered, as in previous examples. Chromatography is carried out on the same column as in Example 4. Elution of adsorbed nickel is done with a solution of 30 g. ammonium carbonate per liter of 14% ammonia water. Final volume is 12 liters. A well-defined cobalt band is found on the column.

The nickel carbonate is recovered by boiling the solution under stirring. Yield, 263 g.

*Example 7*

A total of 1200 g. of nickel carbonate is taken up in 15 liters of 14% ammonia water containing 25 g. ammonium carbonate per liter in two lots, forming in each case a solution saturated with nickel carbonate. This solution is oxidized with 55 ml. of 30% hydrogen peroxide and passed through an Amberlite IRC-50 column having an in-place volume of 1130 ml. Without elution of the column, the effluent solution is treated with Raney nickel from 10 g. alloy as in Example 5, filtered, and decomposed by boiling. There is recovered 863 g. nickel carbonate having spectrographic contaminants as follows:

| Element: | Percent |
|---|---|
| Silver | <0.001 |
| Cobalt (not detected) | <0.01 |
| Copper | 0.0004 |
| Iron | 0.0015 |
| Lead, manganese, tin (not detected) | <0.001 |
| Zinc (not detected) | <0.003 |

The column is eluted with 14% ammonia water containing 50 g. ammonium carbonate per liter, the eluate is treated with Raney nickel from 4 g. alloy as in previous cases, filtered, and decomposed by boiling. Recovered 196 g. having spectrographic analysis:

| Element: | Percent |
|---|---|
| Silver | <0.001 |
| Cobalt (not detected) | <0.01 |
| Copper | 0.0012 |
| Iron | 0.0028 |
| Lead, manganese, tin (not detected) | <0.001 |
| Zinc (not detected) | <0.003 |

Any departure from the above description which conforms to the present invention is intended to be included within the scope of the claims.

What is claimed is:

1. A process for removing cobalt from nickel which comprises contacting an ammoniacal solution of a divalent nickel-ammonia complex and higher valence cobalt-ammonia complexes with a cation exchange resin in its salt form to adsorb the nickel and cobalt complexes on the resin and eluting the resin with an aqueous solution containing ammonium hydroxide and an ammonium salt to remove substantially all of the nickel from the resin.

2. A process for removing cobalt from nickel which comprises contacting an ammoniacal solution of a divalent nickel-ammonia complex and higher valence cobalt-ammonia complexes with a cation exchange resin in its salt form to adsorb the nickel and cobalt complexes on the resin and eluting the resin with an aqueous solution containing about 10 to 20% ammonium hydroxide and about 2 to 8% of an ammonium salt to remove substantially all of the nickel from the resin.

3. The process of claim 2 wherein the ammonium salt is ammonium carbonate.

4. The process of claim 2 wherein the resin is in its ammonium salt form.

5. The process of claim 2 wherein the resin is a phenol formaldehyde resin deriving its cation exchange capacity from carboxylic acid groups.

6. The process of claim 2 wherein the resin is a phenol formaldehyde resin deriving its cation exchange capacity from sulfonic acid groups.

7. The process of claim 2 wherein the resin is a polystyrene resin deriving its cation exchange capacity from sulfonic acid groups.

8. A process for removing cobalt from nickel which comprises contacting an ammoniacal solution of a divalent nickel-ammonia complex and higher valence cobalt-ammonia complexes with a cation exchange resin in its salt form to adsorb the nickel and cobalt complexes on the resin and eluting the resin with an aqueous solution containing about 14% ammonium hydroxide and about 5% of ammonium carbonate to remove substantially all of the nickel from the resin.

9. A process for producing high purity nickel and cobalt which comprises oxidizing a solution of ammonia complexes of nickel and cobalt thereby converting the ammonium cobalt complex to a higher valence state, contacting the oxidized solution with a cation exchange resin in its salt form to adsorb the nickel and cobalt complexes on the resin, eluting the resin with an aqueous solution containing about 10 to 20% ammonium hydroxide and about 2 to 8% of an ammonium salt to remove all of the nickel from the resin substantially free of cobalt and then eluting with a dilute acid to remove the cobalt from the resin.

10. A process for removing cobalt from nickel which comprises oxidizing a solution of divalent ammonia complexes of nickel and cobalt by reacting with hydrogen peroxide thereby converting the cobalt-ammonia complex to a tervalent state, contacting the oxidized solution with a cation exchange resin deriving its capacity from sulfonic acid groups in its ammonium salt form to adsorb the nickel and cobalt complexes on the resin and eluting the resin with an aqueous solution of ammonia containing an ammonium salt to remove all of the nickel from the resin substantially free of cobalt.

11. A process for removing cobalt from nickel which comprises oxidizing a solution of divalent ammonia complexes of nickel and cobalt by reacting with hydrogen peroxide thereby converting the cobalt-ammonia complex to a tervalent state, contacting the oxidized solution with a cation exchange resin deriving its capacity from carboxylic acid groups in its ammonium salt form to adsorb the nickel and cobalt complexes on the resin and eluting the resin with an aqueous solution of ammonia and an ammonium salt to remove all of the nickel from the resin substantially free of cobalt.

12. A process for removing cobalt from nickel which comprises contacting an ammoniacal solution of a divalent nickel-ammonia complexes and a higher valence cobalt-ammonia complex with a cation exchange resin in its salt form until said resin is saturated with nickel-ammonia and cobalt-ammonia complexes, and thereafter contacting said resin with additional ammoniacal solution of divalent nickel-ammonia complex and higher valence cobalt-ammonia complex whereby the adsorbed nickel-ammonia complex is replaced by cobalt-ammonia complex, and recovering the eluate containing nickel complex substantially free of cobalt.

References Cited in the file of this patent

UNITED STATES PATENTS 2,711,958    Schaufelberger et al. _____ June 28, 1955

FOREIGN PATENTS 1,098,071    France _____ Mar. 2, 1955

OTHER REFERENCES

"J. Phys. Chem.," vol. 48 (Nelson et al.), 1944. (Page 406 relied on.)

"Ion Exchange Resins" (Kuhin et al.), publ. by John Wiley & Sons (1950). (Page 139 relied on.)

"Metall und Erz," No. 22, pp. 449–455 (Grother et. al.), Nov. 2, 1933. (Pages 15 and 16 of translation of interest.)

UNITED STATES PATENT OFFICE
CERTIFICATE OF CORRECTION

Patent No. 2,848,322                                                August 19, 1958

John B. Conn et al.

It is hereby certified that error appears in the printed specification of the above numbered patent requiring correction and that the said Letters Patent should read as corrected below.

Column 4, line 74, for "400 ml." read -- 4000 ml. --; column 8, line 10, for "complexes" read -- complex --.

Signed and sealed this 21st day of October 1958.

(SEAL)

Attest:
KARL H. AXLINE
Attesting Officer

ROBERT C. WATSON
Commissioner of Patents